United States Patent [19]

Baxter et al.

[11] 3,743,001

[45] July 3, 1973

[54] VEHICLE VENTILATOR

[76] Inventors: John Keith Baxter, 20 Hannams Close, Lytchett Matravers; Paul Thomas Stiddard, 17 Ingleshan Way Hamworthy, both of Poole, Dorset, England

[22] Filed: Jan. 14, 1971

[21] Appl. No.: 106,567

[30] Foreign Application Priority Data
Jan. 14, 1970 Great Britain.................... 1,725/70

[52] U.S. Cl................. 160/105, 160/136, 160/161, 160/162
[51] Int. Cl........................................... E06b 7/082
[58] Field of Search................... 160/105, 215, 161, 160/136

[56] References Cited
UNITED STATES PATENTS

| 216,712 | 6/1879 | Walton | 160/161 X |
|---|---|---|---|
| 3,058,517 | 10/1962 | Jacobs et al. | 160/136 |

*Primary Examiner*—Kenneth Downey
*Attorney*—Jones & Lockwood

[57] ABSTRACT

A ventilator grille, to be fitted into the aperture of a partly open window of a vehicle, comprises a lattice of pivotally intersecting strips. At one edge of the lattice the strips are grooved to seat on the exposed edge of the window, and at the opposite edge the strips project for seating in the glass-receiving channel of the window frame.

1 Claim, 4 Drawing Figures

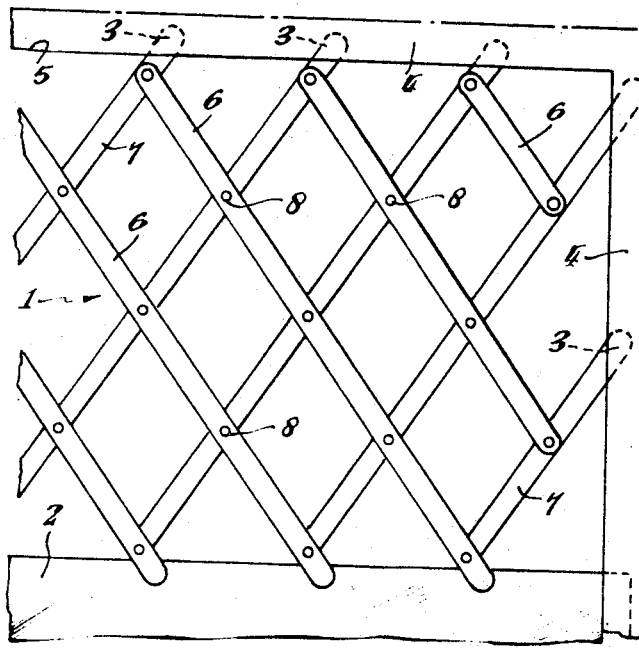
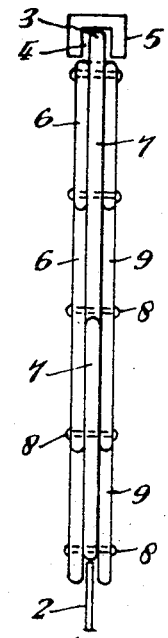
Fig.1.   Fig.2.
Fig.3.
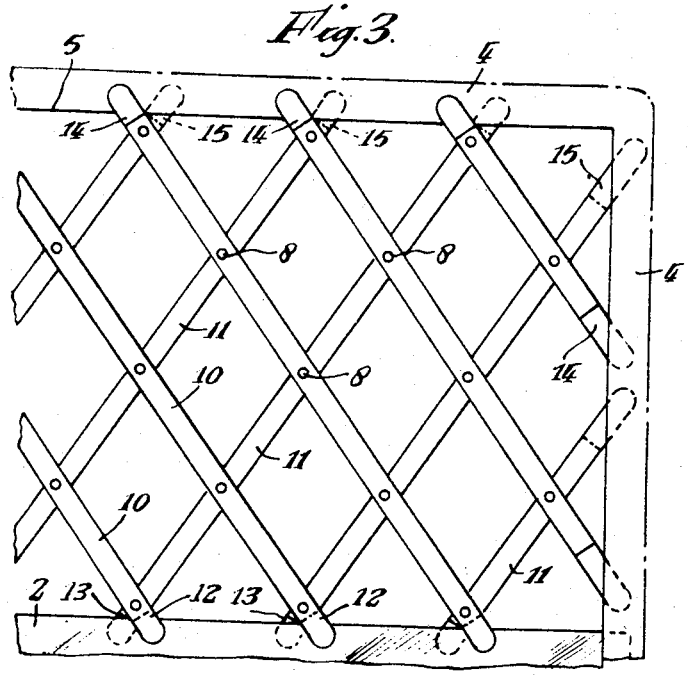
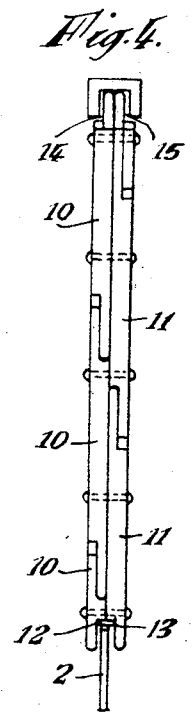
Fig.4.

VEHICLE VENTILATOR

The invention relates to a ventilator grille for a vehicle sliding window. It is sometimes necessary although undesirable to leave a motor or other vehicle unattended with one or more windows open for the purpose of ventilation. Such practice clearly permits easy access to the vehicle interior to a would-be thief and a method of ventilating the vehicle without this disadvantage is desirable.

Accordingly, the invention provides a ventilator grille for a vehicle sliding window comprising a rectangular lattice of intersecting strips, one edge of the lattice having a groove or grooves to admit the exposed edge of an opened or partially opened vehicle sliding window glass and at least the opposite edge of the lattice having a projection or projections for insertion into the glass receiving channel of the window frame, the construction and arrangement being such that, in use, the grille is supported in the gap of an opened or partially opened vehicle window extending between the exposed edge of the glass and the glass receiving channel of the frame.

The invention further provides a ventilator grille for a vehicle sliding window comprising an adjustable rectangular lattice of pivoted intersecting strips, one edge of the lattice having grooves to admit the exposed edge of an opened or partially opened vehicle sliding window glass and the other three edges of the lattice having projections for insertion into the glass receiving channels of the window frame.

In order that the invention may be fully understood preferred embodiments thereof will now be described by way of example with reference to the accompanying drawings.

In the drawings:

FIG. 1 shows a portion of a ventilator grille employing three layers of strips, in accordance with the invention, in use supported in the gap between the glass of an opened vehicle window and the glass receiving channels of the frame, FIG. 2 shows the end view of the grille shown in FIG. 1, FIG. 3 shows a portion of another form of ventilator grille employing two layers of strips, in accordance with the invention, in use supported in the gap between the glass of an opened vehicle window and the glass receiving channels of the frame, and FIG. 4 shows the end view of the grille shown in FIG 3.

Referring to FIG. 1 and FIG. 2 a portion of a ventilator grille 1 is shown in position with its lower edge fitted over a motor vehicle window glass 2. The three other edges of the grille having projecting portions 3 which extend into the glass receiving channels 4 of the frame 5. Since the grille 1 is illustrated part cut away, only two of these edges are shown in FIG. 1. The grille 1 consists of a lattice of intersecting strips 6 and 7 pivoted together by rivets 8 at each cross-over point. Although hidden in FIG. 1, FIG. 2 shows that the strips 7 are in fact sandwiched between strips 6 and an identical opposing set of strips 9.

The strips 6 and 9 extend beyond the strips 7 along the lower edge of the grille 1 to form grooves into which the window glass 2 can be slotted. At the opposite edge and along the sides of the grille the strips 7 extend beyond the two sandwiching strips 6 and 9 providing the projecting portions 3 which extend into the glass receiving channels 4 of the window frame.

The grille 1 is fitted in the window opening by first slotting the edge of the opened window 2 into the grooves between the front strips 6 and back strips 9 of the grille. The pivoted lattice structure of the grille 1 enables its shape to be adjusted to fit the particular window aperture available. This enables the width of the grille to be initially made less than the width of the window aperture to be filled. Also the window is initially opened a greater distance than that to be filled by the grille. Then with grille 1 supported on the glass 2 the window is moved as if to close it. This causes the projections 3 along the opposite edge of the grille to enter the upper glass receiving channel. Further closure of the window compresses the lattice shaped grille lengthways which is accompanied by an increase of width of the grille forcing the remaining projections 3 along the two sides into the side channels 4 of the frame. The grille is thus securely fixed in the window gap supported along all four edges and provides a certain amount of protection against a thief whilst still permitting ventilation to the vehicle interior.

The alternative structure employing only two layers of strips 10 and 11 is shown in FIG. 3 and FIG. 4. In this case the grooves along the lower edge of the lattice have been made by cutting out notches 12 and 13 from the strips 10 and 11 respectively. Clearly, as an alternative, grooves could be provided as integral inverted U-shaped portions on the end of the strips of one set. Although the projections for fitting into the channels 4 of the frame can be provided as in the previous embodiment by the extending portions of one of the set of strips 10 or 11 beyond the other set, in this embodiment both sets are equally extended and are provided with notches 14 and 15 on their outward surfaces to enable both sets of strips to enter the three available channels of the frame.

The grille may be made from any suitable material such as plastic, wood, metal or rubber, the degree of security obtained by such a device depending of course on the rigidity and strength of the material used. It will be clear that there are many small modifications to the structure which can be made without departing from the spirit of the invention. For example in the two embodiments shown the sets of strips forming the lattice have been shown pivoted together by rivets. These may clearly be replaced by other pivot means which, when the lattice is made from plastic for example, may be integrally moulded onto the strips of one of the sets. To increase the strength of the grille the strips may be widened at various points, especially where they enter the channels of the frame.

What we claim is:

1. A ventilator grille for a vehicle having a frame sliding window therein comprising an adjustable lattice of parallel strips sandwiched between two further sets of parallel strips, the two further sets intersecting the first set and being pivoted thereto so that increase or decrease in length of the lattice gives rise respectively to decrease or increase in width of the lattice, the first set of parallel strips extending beyond the two further sets of parallel strips along one edge of the lattice to provide projections for insertion into the glass receiving channels of the window frame, and the two further sets of parallel strips extending beyond the first set of parallel strips along the opposite edge of the lattice to provide grooves to admit the exposed edge of an opened or partially opened vehicle sliding window glass.

* * * * *